United States Patent [19]
Rostoker et al.

[11] Patent Number: 5,793,416
[45] Date of Patent: Aug. 11, 1998

[54] WIRELESS SYSTEM FOR THE COMMUNICATION OF AUDIO, VIDEO AND DATA SIGNALS OVER A NARROW BANDWIDTH

[75] Inventors: Michael D. Rostoker, Boulder Creek; John Daane, Saratoga; Sandeep Jaggi, San Jose, all of Calif.

[73] Assignee: LSI Logic Corporation, Milpitas, Calif.

[21] Appl. No.: 580,797

[22] Filed: Dec. 29, 1995

[51] Int. Cl.[6] .................................................. H04N 7/14
[52] U.S. Cl. .......................... 348/17; 348/14; 455/452
[58] Field of Search ...................... 348/14–17; 455/400, 455/401, 403, 414, 416, 418–420, 422, 424, 425, 450, 451, 452, 454; 379/202

[56] References Cited

U.S. PATENT DOCUMENTS

| | | | |
|---|---|---|---|
| 5,343,513 | 8/1994 | Kay et al. | 379/59 |
| 5,359,644 | 10/1994 | Tanaka et al. | 348/17 |
| 5,389,965 | 2/1995 | Kuzma | 348/17 |
| 5,491,507 | 2/1996 | Umezawa et al. | 348/14 |
| 5,550,754 | 8/1996 | McNelly et al. | 348/14 |
| 5,585,850 | 12/1996 | Schwaller | 455/454 |
| 5,627,581 | 5/1997 | Kondo | 348/17 |

*Primary Examiner*—Curtis A. Kuntz
*Assistant Examiner*—Stephen W. Palan
*Attorney, Agent, or Firm*—Oppenheimer Wolff & Donnelly LLP

[57] ABSTRACT

A wireless communication unit for a wireless communication system transmits and receives video and audio signals over an RF bandwidth. The RF bandwidth is allocated among the audio and video signals to allow the audio and video signals to fit within the RF bandwidth. The allocation is performed by varying the rates of compression of the audio and video signals. The communication unit is applicable to subscriber units and base stations. Subscriber units such as cellular telephones can display the video images by using fast digital-to-analog converters and a dither technique. During a communication link, the subscriber unit receives a transmission header from another party on the communication link. The transmission header may include a request by the other party to change the allocation of the audio and video signals. If such a request is received, the subscriber unit automatically changes the allocation in response to the request.

32 Claims, 2 Drawing Sheets

WIRELESS SYSTEM FOR THE COMMUNICATION OF AUDIO, VIDEO AND DATA SIGNALS OVER A NARROW BANDWIDTH

BACKGROUND OF THE INVENTION

The invention relates in general to wireless communication systems and in particular to an RF communication system for receiving and transmitting audio, video and data signals.

Today, wireless data solutions are enabling changes of great scope and depth in our society. Indeed, the wireless information revolution has the potential to democratize the information age like never before. Remotely accessible computers and data systems are becoming more and more available, putting us all on the verge of a world where an unlimited amount of information will be available anywhere, anytime.

Wireless data capabilities are also improving the productivity and accessibility of professionals in the field. The ability to send and receive information over airwaves instead of copper wires is liberating the professionals from their offices, giving them immediate access to databases and streamlining every aspect of their operations. Already, notebook computers equipped with advanced wireless communications software and radio frequency modems have enabled the formation of "virtual offices," offices that are removed from company headquarters. Now, a market analysts can track the stock market in his car while sitting in traffic during his commute to work. An engineer, instead of sitting in his office, can work on a CAD file from the pool side of his home.

The explosion of wireless data communication has been fueled by advances in semiconductor technology and software. These advances have allowed audio and data signals to be transmitted over digital networks in digital language, the language of computers.

Digital and mixed signal systems offer many advantages over old-fashioned analog systems. One important advantage is the ability of digital systems to transmit and receive more information at higher rates. Whereas analog systems are limited to transmitting audio at a rate of 64 Kbps, digital systems can compress audio transmissions and transmit eight times as much information at the same rate. Moreover, faster processors have allowed digital systems to transmit bits at ever increasing rates. By taking advantage of the ability to transmit information more accurately and at higher rates, significant savings have been realized in both switching capacity and ongoing line costs.

Additional advantages have been realized through the use of multiple access techniques such as Time Division Multiple Access ("TDMA") and Code Division Multiple Access ("CDMA"). These techniques allow for multiple users to access a single bandwidth. They also allow for audio and data signals transmitted by a single user to be intermingled. These techniques make better use of scarce airwave space.

A recent development in the wireless information revolution has been the transmission of video signals over the airwaves. This is now being done in the television industry, as near-perfect images are being transmitted digitally on the Ku-band from satellites to home-mounted dishes as small as eighteen inches in diameter. A similar development is occurring in the cellular telephone industry as efforts are being made to add video capability to cellular telephones.

Before quality video capability can be added to cellular telephones, a problem arising from bandwidth limitation must be overcome. Current cellular telephone systems operate on a frequency of 900 MHZ. Yet even with the use of sophisticated compression routines, the bandwidth is not wide enough to transmit the enormous amount of video and audio information that is required for quality motion pictures. Bandwidth limitation may not be a problem for high frequency satellite transmissions, but it is a problem for the comparatively low frequency radio transmissions.

Therefore, it is an objective of the present invention to overcome the above-mentioned bandwidth limitation problem and provide video communication capability to a radio frequency communication system.

SUMMARY OF THE INVENTION

The bandwidth limitation problem is overcome by a wireless communication unit comprising at least one digital transceiver operable to transmit and receive compressed video and audio signals over a fixed bandwidth; and a control unit operable to dynamically allocate the fixed bandwidth among the video and audio signals. Bandwidth allocation is performed by varying the rates of compression of the audio and video signals. The communication unit can be a subscriber unit or a base station. The system can utilize a multiple access technique such as Time Division Multiple Access or Code Division Multiple Access.

In one embodiment, the communication unit is a video telephone. Video signals are processed by the video telephone using fast digital-to-analog converters, compression algorithms and a dither technique. The video signals are displayed on a flat panel display, which can be mounted to a surface of the video telephone's housing.

DETAILED DESCRIPTION OF THE PREFERRED EMBODIMENTS

Figure 1:
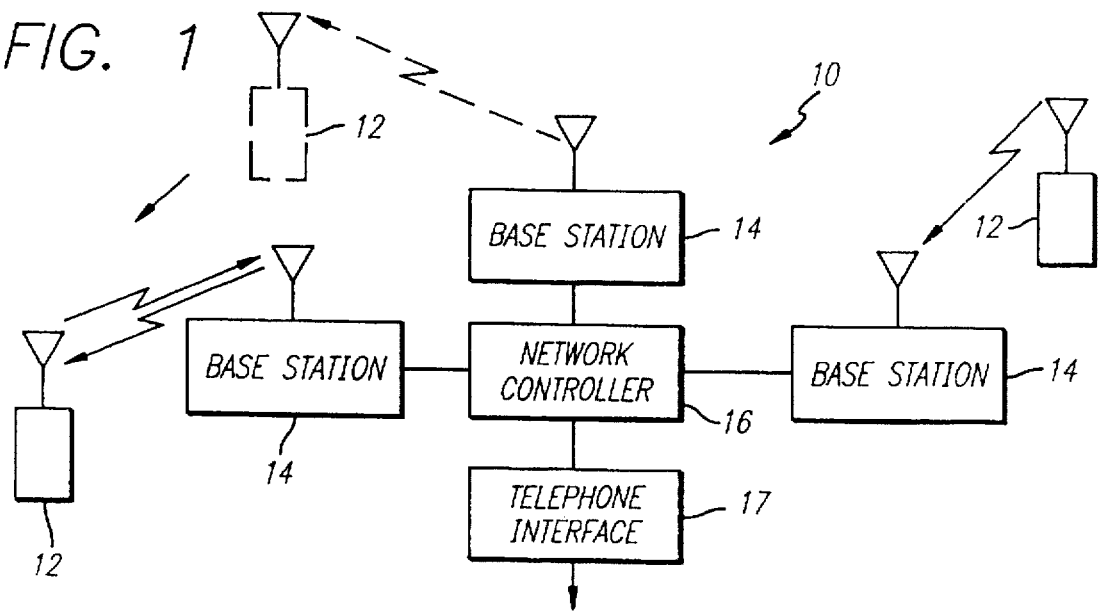
FIG. 1 is a schematic illustration of a cellular communication system.

FIG. 1 shows a cellular communication system 10 including a plurality of subscriber units 12. The subscriber units 12 can include mobile units such as hand held telephones and stationary units such as desktop computers. The system 10 also includes a number of base stations 14 that allow the subscriber units 12 to communicate with each other and with other communication devices in other networks.

The system 10 covers a geographical area that is divided into a grid of cell sites, with each cell site containing at least one base station 14. Each base station 14 communicates with all subscriber units 12 in its cell site via radio frequency ("RF") signals. One frequency is used for transmission from the base station 14 to the subscriber unit 12 (the "downlink" frequency), and a different frequency is used for transmission from the subscriber unit 12 to the base station 14 (the "uplink" frequency). The system 10 employs "frequency reuse" to allow more than one base station 14 to operate at the same radio frequency. Each cell site is made large enough so that RF signals crossing a cell site are attenuated in substantial amount so that they are perceived as lower level noise by base stations in distant cell sites. Frequency isolation occurs in free space because the RF signals are inherently attenuated in proportion to the square of the distance from the radiating source. Isolation is furthered by interference arising from man-made and natural structures.

One or more frequencies are set aside for setting up a communication link or call between the base station 14 and a subscriber unit 12.

The base stations 14 are interlinked with a network controller 16 via a distribution facility such as a dedicated copper wire or fiber optic network, a radio communication link, or a satellite link. The satellite link provides the highest system capacity. The network controller 16, in turn, provides access to existing wireline telephone networks 17. Each base station 14 determines the received signal strength of each call in progress, and forwards this information to the network controller 16. The network controller 16 uses advanced processing technology to keep track of all calls between the subscriber units 12 and base stations 14. The network controller 16 also uses the signal strength information from each base station 14 to determine when a call should be "handed off" from the base station in one cell site to the base station in another cell site. Hand-off allows communication to be maintained with a subscriber unit 12 as the subscriber unit 12 roams from cell site to cell site.

Video, audio and data are transmitted over the airwaves as digital signals between the subscriber units 12 and base stations 14. Sources of video, audio and data are not limited to other subscriber units 12 in the system 10. Since the base stations 14 are linked to telephone networks, data can be provided over wired networks by sources such as private faxes and corporate computers containing commercial databases. Audio can be provided over wired networks by analog telephones, personal computers and even radios. Full-motion video can be provided by direct broadcast satellites and Very Small Aperture Terminals, and by computers over fiber optic and ISDN networks.

Within a cell site, each frequency bandwidth is "shared" by all subscriber units 12, either through a Time Division Multiple Access ("TDMA") technique or a Code Division Multiple Access ("CDMA") technique. The TDMA technique divides up the total bandwidth into a predetermined number of time slots, with each subscriber unit 12 being allocated a specific time slot. One of the time slots contains an imbedded control channel. Each base station 14 continuously transmits time division multiplexed bit streams to the subscriber units 12 on the downlink frequency, with each subscriber unit 12 responding by transmitting bursts on the uplink frequency. Even if a base station 14 is not communicating with a subscriber unit 12, a dummy time slot transmission is sent.

The CDMA technique, instead of dividing up the total bandwidth into time slots, spreads the signal of each subscriber unit 12 across the entire bandwidth. Although each subscriber unit 12 generally occupies the entire bandwidth designated by the base station 14, it utilizes only a portion of the power available to the base station 14. The information-bearing signal is multiplied by a high bandwidth, high frequency digital spreading signal, which expands the narrow bandwidth information-bearing signal into a broad spread signal covering the entire transmission bandwidth. The spreading signal uses quasi-orthogonal bit sequences of period Tc, referred to in the art as chips. The chip sequence causes the cross-correlation function between subscriber units 12 to be small, in which event the subscriber units 12 are quasi-orthogonal to each other. The chip sequence can be generated or chosen so that a predetermined or unique chip sequence is assigned to a specific subscriber unit 12 each time the subscriber unit 12 starts a call. This, of course, requires the network controller 16 to maintain a central log or listing of all user chip sequence assignments.

Figure 2:
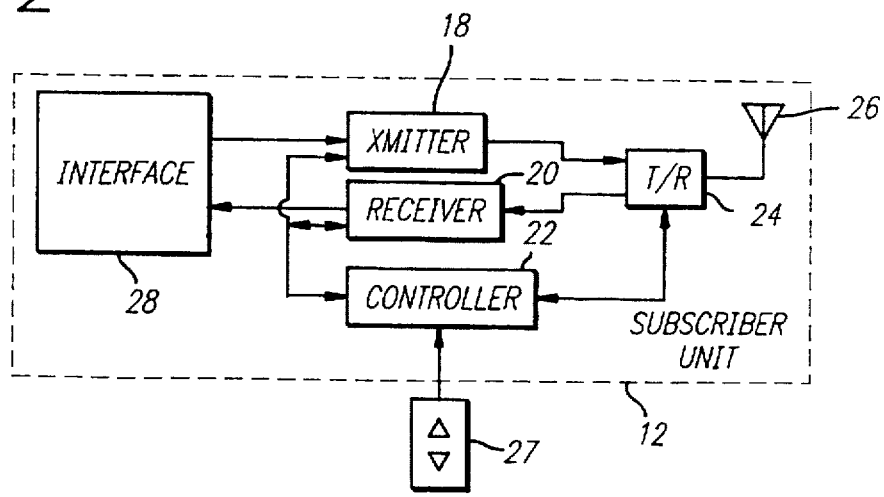
FIG. 2 is a block diagram of a subscriber unit according to the present invention.

FIG. 2 shows the subscriber unit 12 for the cellular system 10. The subscriber unit 12 includes a transmitter 18, receiver 20, controller 22, T/R module 24 and a high efficiency antenna 26. The controller 22 defines and implements the protocol for the subscriber unit 12. That is, it defines the convention through which the subscriber unit 12 can communicate with the base station 14. The controller 22 decodes the header of each base station transmission and executes a protocol structure which controls timing and decision making logic instructions (e.g., timing, message slot selection, T/R control) and other well known operations. Prior to a call setup, the subscriber unit 12 monitors air time, activity, account numbers, and protocol of the base station 14 to determine whether it can access the system 10. When the subscriber unit 12 is ready to make a call, or when a call is transmitted to it, the subscriber unit 12 establishes a setup channel with a proximate base station 14. During call setup the base station 14 specifies the unique time slots and uplink/downlink frequencies for the subscriber unit 12 to transmit and receive the call.

In addition to these well known operations, the controller 22 allocates the RF bandwidth among the audio, video and data signals. Bandwidth is allocated by varying the compression rates of the audio and video signals. The compression rates are dynamically varied to allow as much audio and video as possible to be transmitted within the RF bandwidth. When the audio compression rate is decreased, the bandwidth of the audio is increased and the bandwidth of the video is decreased. As a result, audio fidelity is improved and video quality is degraded. Conversely, when the audio compression rate is increased, the audio bandwidth is decreased and the video bandwidth is increased. This results in an improvement of the video quality and a degradation of the audio fidelity.

The subscriber unit 12 automatically performs the bandwidth allocation in response to a request from another party on the communication link. If the other party desires a higher quality audio, it sends an appropriate request to the subscriber unit 12. The subscriber unit 12 responds by decreasing the audio compression rate to improve the quality of the audio being transmitted to the other party. If it is desired for the subscriber unit 12 to receive higher quality video, an input for lower sound fidelity is made by using an input device such as a keypad 27, and the subscriber unit 12 transmits the request for lower audio fidelity to the other party.

This requires a protocol that is tailored for dynamic bandwidth allocation of video and audio signals. To implement this protocol, two bits in a transmission header are dedicated to the request. The two bits represent four possible conditions: audio increase, audio decrease, no change in audio, and preset audio.

On the receiving end, the controller 22 constantly checks for requests from the other party by monitoring the transmission headers received during the communication link. When the subscriber unit 12 receives a request, its controller 22 determines the appropriate bandwidths for the audio and video signals.

Using the bandwidths from the controller 22, the transmitter 18 compresses the audio and video signals. Following compression, audio, video and data signals are formatted, transported and multiplexed together with the transmission header (which includes the two-bit request) to form a composite signal. The composite signal is further processed by the transmitter 18 into either a spread spectrum signal or a time division multiplexed signal, depending upon whether CDMA or TDMA is being used by the system 10. The encoded signal is used to modulate a carrier signal. The modulated carrier signal is sent to the antenna 26 through the T/R module 24. For subscriber units 12 that do not have a video capability, only audio and data signals are multiplexed with the header to form the composite signal, with compression being performed on the audio signal only.

RF signals received on the antenna 26 are sent to the receiver 20 through the T/R module 24. The receiver 20 separates the incoming signal into four demodulated signals: a compressed video signal, a compressed audio signal, a data signal and a transmission header. The transmission header is sent to the controller 22 and monitored for a request to increase audio fidelity. The compressed video signal, compressed audio signal and the data signal are unformatted. The compressed signals are then decompressed using compression rates embedded in the compressed signals. The decompressed signals, along with the unformatted data signal, are forwarded to the appropriate interfaces 28 in the subscriber unit 12.

The types of interfaces 28 utilized by the subscriber unit 12 are partly dependent upon whether the unit 12 is stationary or mobile. For a mobile subscriber unit 12 such as a cellular telephone, the interfaces 28 must fit within a standard cellular phone case. Audio signals sent from the transmitter 18 and received by the receiver 20 can be handled by microphones, speakers and their associated circuitry in the conventional manner. Data signals supplied to the transmitter 18 and received by the receiver 20 can be transferred in and out of the cellular telephone through a serial or parallel port on the case. Video signals received by the cellular telephone can be synchronized with the audio signals and displayed on a small flat panel display mounted to a surface of the cellular telephone's case, or they could be supplied to a CRT through a parallel port on the case. Video signals supplied to the cellular telephone can be provided on a parallel or serial port on the case. For example, an automobile can be equipped with a camera and video capture card that would supply the video signal to the port. It is even possible to furnish the cellular telephone with an internal CCD, optical assembly and video processor for providing video images directly to the transmitter 18.

Stationary units, especially desktop personal computers, can be equipped with more elaborate interfaces. Audio signals can be supplied to a resident sound card by a hand held microphone and they can be outputted from the sound card to a speaker system. Data signals can be supplied to the transmitter 18 directly from computer memory, the computer's motherboard or from communications ports, and data from the receiver 20 can be saved in computer memory, forwarded to a printer or displayed on a CRT. Video signals can be supplied by a hand held camera and a resident video capture card, with the video image from the camera being quantized by the video capture card in both the spatial domain and the intensity domain. Video signals received by the computer can be saved in computer memory or displayed directly on the CRT.

A desktop computer having a "PENTIUM" processor or a more powerful processor can be adapted to operate as a subscriber unit 12 with the addition of only a single card. The transmitter 18, receiver 20, T/R module 24 and interfaces 28 are mounted to the single card, which is inserted into the backplane of the computer. The transmitter 18 and receiver 20, which perform analog and digital signal processing, are of mixed signal ASIC designs. It is not necessary to add a controller 22 to the card; only a Read-only Memory (ROM) need be mounted. Instructions for the controller are stored in the ROM, and the instructions are executed by the computer's microprocessor.

When displaying the video image, a dither or similar technique is used. This allows a reduction in the amount of video information necessary to display a quality image. A VGA-based CRT can display 640 horizontal by 480 vertical pixels (640×480). CRTs typically have a set of three phosphors—red, green and blue—at each pixel location. This allows each pixel to display a gamut of colors falling within a three dimensional cube. Colors at the eight vertices of the cube are black, white, red, green, blue, cyan, magenta and yellow. Colors within the cube are produced by mixtures of various intensities of red, green, and blue. Digital words representing the colors are converted to an analog video signal, which causes an electron gun to illuminate the phosphors of the CRT, thereby creating light.

The higher the color and spatial resolutions of the reproduced image, the better its perceived image quality. Color resolution is equivalently measured by the number of data bits for storing each pixel of the image in a computer's video memory. The display of "true color" would requires a bit length of 24 bits. However, the amount of video information would be enormous.

The amount of video information is drastically reduced by limiting the bit length to 8-bits and using a simulation technique to simulate the true colors of an image. Pixel words of 8-bit can display 256 colors simultaneously, and the simulation technique can be used to simulate many of the 16 million colors offered by 24-bit resolution.

One approach for simulating the true colors is to employ a color palette or lookup table containing an optimal selection of colors. The palette contains those colors which occur most frequently in the image being reproduced. For 8-bit color resolution reproductions, the 256 colors used most frequently in the image are be chosen to fill the color palette. When the image is reproduced, each color in the video image is mapped to the nearest color in the palette. Usually, the quality of the resulting image is improved since the true color of most of the image's pixels will be in the palette.

Another approach is to employ a dither technique, which permits the simulation of intensity levels between quantized levels by permitting the eye to integrate fine detail within an area and record only the overall intensity of the area. Dithering aims to sacrifice some of an image's spatial resolution for an increase in perceived intensity resolution, accomplished by averaging the intensities of several neighboring pixels to simulate intensities that lie between quantization levels.

Several types of dithering techniques are known. "Ordered dither" relies on the eye's ability to blend the colors of adjacent pixels over small spatial areas so that an intermediate color is perceived. This approach focuses on replacing or mapping non-displayable colors (those not in the displayable color palette) within defined areas of the image to displayable colors to best simulate the true color when viewed by the human eye. The neighborhoods are chosen according to a two dimensional set of values, referred to as the dither table or dither matrix, which is tiled into the image's coordinate space. The values contained in the table are used to make decisions about which quantized intensity value will be output at each position, that is, should the intensity value be quantized to the quantized value above or below the original intensity value. The dither table values are different at each coordinate location such that when a constant input intensity is dithered over some area, the output values will alternate in some pattern between the upper and lower quantized intensity levels.

Hardware and software for displaying the video image using a dither technique is readily available.

In the past, the above techniques were used to reduce memory requirements of the display system. Here, however, the above techniques are used to reduce the number of transmitted video bits. In combination with data compression, the video information can be minimized, yet "true color" quality of the video image can still be maintained.

Figure 3:
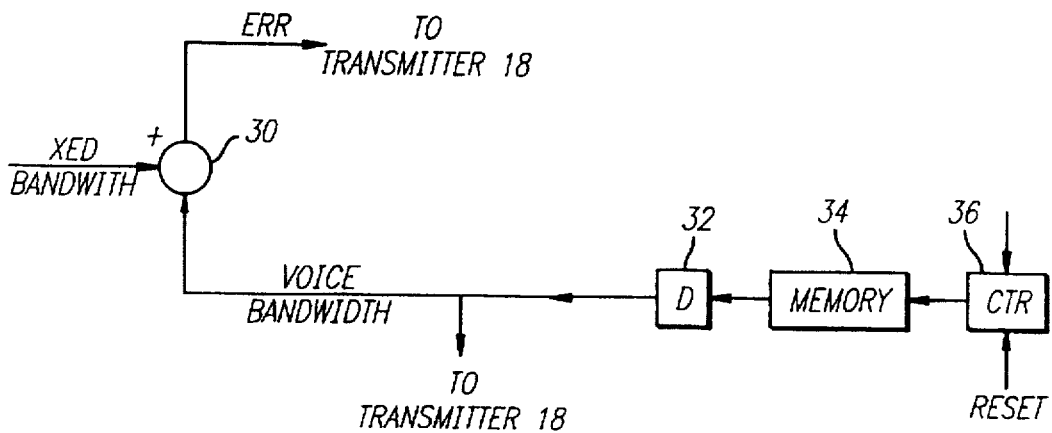
FIG. 3 is a logic diagram for the dynamic allocation of an RF bandwidth among video and audio signals, the logic being executed by the subscriber unit shown in FIG. 2.

FIG. 3 shows the logic executed by the controller 22 for the dynamic allocation of the RF bandwidth among the video and audio signals. The logic includes a summing junction 30 for generating an error signal ERR indicating the difference between the RF bandwidth and the audio bandwidth. The error signal ERR is, of course, equal to the video bandwidth, the available bandwidth for video signal. The error signal ERR is supplied to a video compression module in the transmitter 18, which compresses the video signal until the video signal fits within the video bandwidth.

The audio bandwidth is also supplied to the transmitter 18. The transmitter 18 compresses the audio signal until it fits within the audio bandwidth.

The RF bandwidth is an a priori value that can be hard-wired to the summing junction 30. The audio bandwidth is supplied to the summing junction 30 via a latch 32. An input of the latch 32 is coupled to a memory device 34, which stores a number of different values indicating different audio bandwidths for the audio signal. The bandwidth values can be stored in the memory device 34 during manufacture, or they can be downloaded to the memory device 34 during call setup.

The bandwidth value supplied to the latch 32 by the memory device 34 is determined by a counter 36, which indexes the memory device 34. Assume that the bandwidth values are stored in consecutive addresses in the memory device 34, and that the values increase as the addresses increase. Incrementing the counter 36 causes the memory device 34 to output a greater bandwidth value. As the value stored in the latch 32 is increased, the error signal ERR and, therefore, the available bandwidth for video signal are decreased. As a result, video quality is decreased. Decrementing count results in a lower bandwidth value to be supplied to the latch 32 by the memory device 34. As the bandwidth value stored in the latch 32 is decreased, the error signal ERR and, therefore, the available bandwidth for the video signal are increased.

The counter 36 can be reset to a preset value. This allows the audio bandwidth to be preset at any time during a call.

Requests to increment and decrement the counter 36 are supplied to an input of the counter 36. The requests are derived from the two bits of the transmission header.

Figure 4:
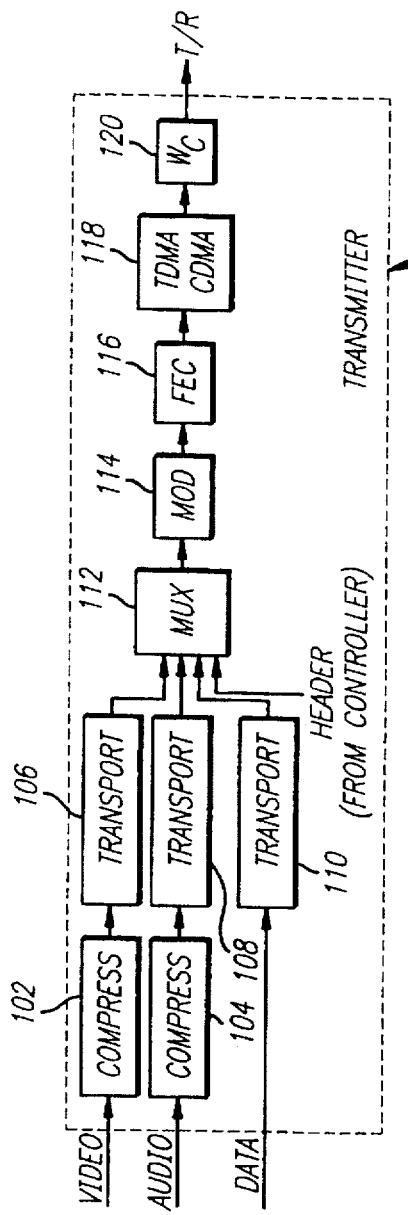
FIG. 4 is a block diagram of a transmitter for the subscriber unit shown in FIG. 2.

FIG. 4 shows the functions performed by the transmitter 18. The digital video signal is compressed according to an algorithm that supports variable rate compression (block 102). The digital audio signal is also compressed according to an algorithm that supports variable rate compression (block 104). The video and audio signals are compressed until they fit within the video and audio bandwidths that are allocated by the controller 22.

The compressed video signal is broken up into video transport packets (block 106), and the audio signal is broken up into audio transport packets (block 108). The data signal, although uncompressed, is broken up into data transport packets (block 110). Each transport packet includes a header and data portion. In the case of the compressed signals, the header will indicate whether the compression rates are stored in the first few bytes of the data portion.

Apparatus and methods for compressing the audio and video signals are disclosed in U.S. Ser. No. 08/580,547 filed Dec. 29, 1995, and incorporated herein by reference. The apparatus supports variable rate compression and utilizes multiple compression algorithms. During a communication link, for example, the apparatus can use an MPEG-1 algorithm for both audio and video compression. During another communication link, the same apparatus can use an MPEG-2 algorithm for video compression and Dolby AC3 for audio compression.

The audio, video and data transport packets are multiplexed together with the transmission header to form a composite signal (block 112). The transmission header, which is generated by the controller 22, includes the two bits that request the other party to change the bandwidth of the audio signal being transmitted by that party.

The composite signal is then modulated using phase shift keying (PSK) modulation, frequency shift keying (FSK) modulation, or any other type of modulation suitable for a TDMA or CDMA system (block 114). The PSK modulation may be any of binary phase shift keying (BPSK) modulation, quadrature phase shift keying (QPSK) modulation, M-ary phase shift keying (MPSK) modulation where M is larger than four, or variants of differential phase shift keying (DPSK) modulation.

Following modulation is forward error correction (block 116). Signals to be transmitted are encoded by coding schemes such as Linear Predictive Coding (LPC) or Continuously Variable Sloped Delta (CVSD) modulation. Actual data bits forming the input signal are interleaved with additional bits for ascertaining, or monitoring errors and providing for correction.

If the system uses a CDMA technique, the digitally encoded information signal is mixed with a spreading chip sequence, which is assigned to the subscriber unit (block 118). The chip sequence is sent by the subscriber unit to the base station 14 as part of the call setup. It is desirable to spread the communication signal to cover the entire allocated bandwidth where possible and achieve a high processing gain.

The mixed broad band spread information signal is then mixed with a carrier frequency to produce the communication signals to be transmitted (block 120). The specific frequency used is predetermined by the spectral allocation for the communication system 10. The modulated signal is sent to the T/R module 24, which transmits the signal under the control of the controller 22.

If the system uses a TDMA technique, the digitally encoded information signal is used to modulate a carrier frequency only during the allocated time slot (blocks 112 and 114). The resulting burst is transmitted by the T/R module.

Figure 6:
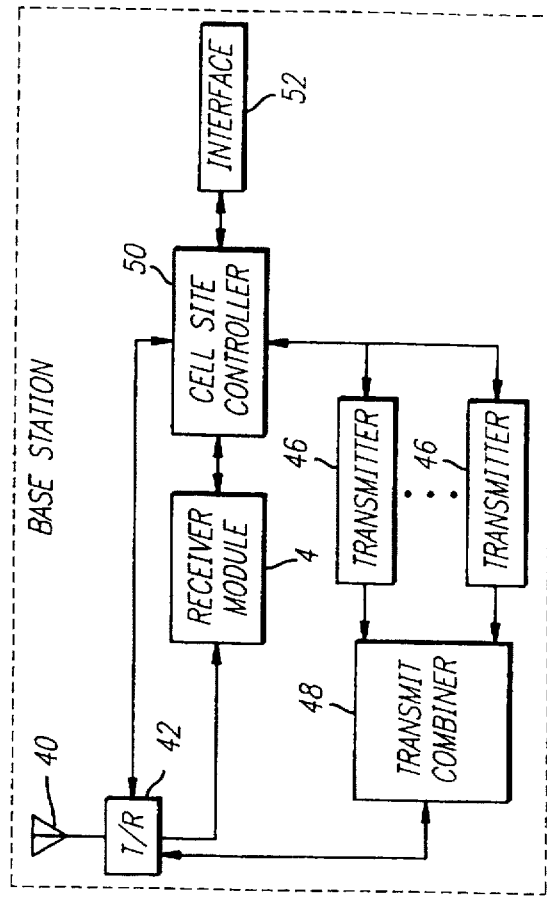
FIG. 6 is a block diagram of a base station according to the present invention.
Figure 5:
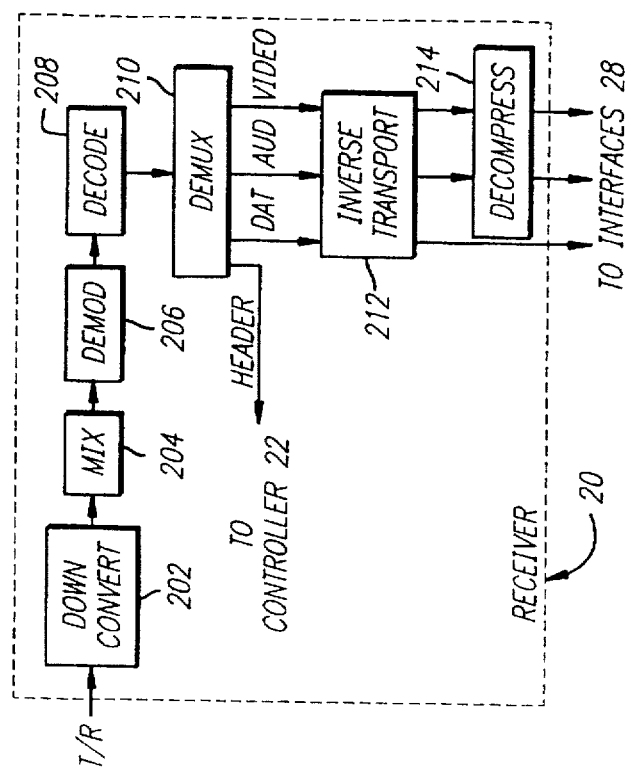
FIG. 5 is a block diagram of a receiver for the subscriber unit shown in FIG. 2.

FIG. 5 shows the functions performed by the receiver 20. The receiver 20 performs low noise amplification on the signal received from the antenna and T/R module and down converts the amplified signal into an intermediate frequency (IF) signal (block 202). Gain control of the IF signal is performed and the gain-controlled IF signal is mixed to form a baseband signal (block 204). The baseband signal is then locked onto and demodulated by breaking it into its in-phase (I) and quadrature (Q) components, which are converted in to a digital signal (block 206). The digital signal is deinterleaved and decoded at a predetermined decoding rate by a convolutional decoder such as a Viterbi algorithm decoder (block 208). The decoded signal is then demultiplexed into a transmission header and video, audio and data transport packets (block 210). The transmission header is supplied to the controller 22 and the audio, data and video signals are sent to an inverse transport processor (block 212). The compressed audio and video signals are thereafter decompressed using the audio and video compression rates embedded in the data portion of the transport packet (block 214). The decompressed video and audio signals are synchronized and then forwarded, along with the unformatted data signal, to the appropriate interfaces. FIG. 6 shows the base station 12 for the cellular system 10. Signals received by an antenna 40 are supplied to a receiver module 44 via a T/R module 42. For a CDMA system, the receiver module 44 includes a power splitter which sends the incoming signal to a plurality of receivers, each of which handles a specific communication link. Thus, each base station 14 for a CDMA system will employ as many receivers as communication links it is expected to establish at a given time. All receivers for the CDMA function in substantially the same manner as the receiver 20 shown in FIG. 5, except that they employ narrower band filters and timing loops instead of pilot tracking circuitry. For a TDMA system, the receiver module 44 contains a single receiver that functions in substantially the same manner as the receiver shown in FIG. 5, except that it includes a demultiplexer and associated circuitry for forwarding the received bursts onto separate communication links.

Digital audio, data and video signals are supplied to a plurality of transmitters 46, each of which is dedicated to a specific communication link. The modulated carrier signals from the various transmitters 46 are combined by a transmit combiner 48. In the case of the TDMA system, the bursts from the transmitters 46 are combined at their selected time slots to provide a continuous stream of time-division multiplexed information. In the case of the CDMA system, the spread spectrum signals are combined to provide a composite spread spectrum signal. The combined transmit signal from the transmit combiner 48 is then supplied to the antenna 40 through the T/R module 42.

The base station 14 is controlled by a cell site controller 50 in the same manner that a subscriber unit 12 is controlled by its controller 22, except that the cell site controller 50 directs the base station 14 to communicate with all of the subscriber units 12 on all of the communication links. The cell site controller 50 also determines signal strength information necessary for a hand-off decision, and passes the information to the network controller 16.

The base station 14 also includes an interface 52 for sending the video, audio and data signals in digital form to the network controller 16. The network controller 16 places the audio, video and data signals on a telephone network, sends the signals to other base stations, places them on a satellite link, etc. If the base station 14 has direct access to an existing telephone network, the interface 52 would include data-to-audio decoders for sending analog audio signals over the network and audio-to-data encoders for receiving the analog audio signals.

Thus disclosed is an RF communication system that overcomes the problem of bandwidth limitations associated with the transmission of audio and high quality video signals. The problem is overcome by dynamically allocating the bandwidth among the audio and video signals.

Further disclosed is a protocol for the transmission of audio and video signals. Protocols for current TDMA and CDMA systems are not optimized for allocating the RF bandwidth during a communication link.

Still further disclosed is a method for displaying a video image using advanced dither techniques in combination with compression algorithms and fast digital-to-analog converters. The method allows the amount of transmitted video to be greatly reduced.

Finally, disclosed is a mobile video telephone that can display high quality video. The video telephone can also be adapted to transmit video.

It is understood that various changes and modifications may be made without departing from the spirit and scope of the invention. For example, the controller 22 can use video bandwidth as the controlling parameter instead of audio bandwidth. It is also understood that use of the invention is not limited to CDMA and TDMA communication systems, but can be applied to any other type of narrow bandwidth communications system. Accordingly, the present invention is not limited to the precise embodiment described hereinabove.

We claim:

1. A wireless communication unit, comprising:
   at least one digital transceiver operable to transmit and receive compressed video and audio signals over a fixed bandwidth;
   a controller operable to dynamically allocate the fixed bandwidth among the video and audio signals, the dynamic allocation being performed by varying the rates at which the audio and video signals are compressed;
   wherein the fixed bandwidth is an RF bandwidth; and
   wherein the controller performs the step of generating an error signal indicating a difference between first and second signals representing the fixed bandwidth and the bandwidth allocated to one of the audio and video signals; and wherein the transceiver performs the steps of:
     varying the compression rate of one of the audio and video signals in response to the second signal; and
     varying the compression rate of the other one of the audio and video signals in response to the error signal.

2. The communication unit of claim 1, wherein the controller includes a summing junction having inputs adapted to receive first and second signals representing the fixed bandwidth and bandwidth allocated to one of the video and audio signals; and wherein the transceiver performs the steps of:
   varying the compression rate of one of the audio and video signals in response to the second signal; and
   varying the compression rate of the other one of the signals in response to the error signal.

3. The communication unit of claim 2, wherein the controller further includes a memory device for supplying the second signal to the summing junction, the second signal representing a value stored in the memory device.

4. The communication unit of claim 3, wherein a plurality of different values are stored in the memory device, and wherein the controller further includes means for selecting one of the values stored in the memory device, the second signal representing the selected value.

5. The communication unit of claim 1, wherein the controller generates a transmission header including a request to change the bandwidth allocation among the audio and video signals.

6. The communication unit of claim 5, wherein the request occupies two bits in the transmission header.

7. The communication unit of claim 1, wherein the transceiver is also operable to decompress incoming audio and video signals.

8. The communication unit of claim 1, wherein the communication unit is a subscriber unit, and wherein the transceiver includes:

an antenna;

a T/R module coupled to the antenna;

a receiver having an input coupled to the T/R module; and a transmitter having an output coupled to the T/R module.

9. The communication unit of claim 8, wherein the receiver includes:

a demodulator for demodulating an incoming signal from the T/R module;

a demultiplexer for separating the demodulated signal into a transmission header and video, audio and data signals, the transmission header being supplied to the controller;

a first decompressor for decompressing the video signal according to a rate embedded in the video signal; and a second decompressor for decompressing the audio signal according to a rate embedded in the audio signal.

10. The communication unit of claim 9, further comprising a circuit utilizing a dither technique to display the video signal, whereby the displayed video signal is compressed prior to transmission and dithered after transmission.

11. The communication unit of claim 8, wherein the transmitter includes:

a first compressor for compressing the video signal to fit within a video bandwidth supplied by the controller;

a second compressor for compressing the audio signal to fit within a audio bandwidth supplied by the controller;

a combiner for combining the compressed video and audio signals;

a PSK modulator responsive to an output of the combiner; and a carrier frequency modulator, responsive to an output of the PSK modulator.

12. The communication unit of claim 11, further including an input for a data signal, and wherein the combiner also combines the data signal with the compressed audio and video signals.

13. The communication unit of claim 11, wherein the transmitter further includes an encoder between the combiner and PSK modulator for generating a code division spread spectrum signal from an output of the combiner, the spread spectrum signal being supplied to the PSK modulator.

14. The communication unit of claim 11, wherein the transmitter further includes an encoder between the combiner and PSK modulator for generating a time division multiplexed signal from an output of the combiner, the time division multiplexed signal being supplied to the PSK modulator.

15. A wireless system for the communication of audio and video signals over an RF bandwidth, comprising:

a plurality of subscriber units operable to allocate the RF bandwidth among the audio and video signals;

a plurality of base stations covering a geographical area divided into a plurality of cell sites, each base station being operable to establish RF communications links with the subscriber units in its cell site; and a network controller connected to the plurality of base stations;

wherein each subscriber unit receives a plurality of transmission headers during a communication link, each transmission header including a number of bits indicating whether a request to change the allocation of the RF bandwidth between the video and audio signals has been made.

16. The system of claim 15, wherein the number of bits indicate whether the allocated bandwidth of the audio signal should be increased or decreased.

17. The system of claim 15, wherein the transmission header includes two bits for indicating whether the allocated audio bandwidth should be increased, decreased, changed to a preset value, or left unchanged.

18. The system of claim 15, wherein at least one subscriber unit comprises:

a digital transceiver operable to transmit and receive compressed video and audio signals over the RF bandwidth; and a controller operable to dynamically allocate the RF bandwidth among the video and audio signals prior to transmission, the dynamic allocation being made in response to the transmission header of a received signal.

19. The system of claim 15, wherein at least one base station comprises:

at least one digital transceiver operable to transmit and receive compressed video and audio signals over the RF bandwidth; and a controller operable to dynamically allocate the RF bandwidth among the video and audio signals prior to transmission, the dynamic allocation allowing the audio and video signals to be transmitted within the RF bandwidth.

20. A mobile video telephone, comprising:

a digital transceiver operable to transmit and receive compressed video and audio signals over an RF bandwidth;

a controller operable to dynamically allocate the fixed bandwidth among the video and audio signals, the dynamic allocation being performed by varying the rates at which the audio and video signals are compressed;

a display system including a flat panel display and a driver circuit utilizing a dither technique for displaying the video signal on the display;

wherein the controller includes a summing junction having inputs adapted to receive first and second signals representing the fixed bandwidth and bandwidth allocated to one of the video and audio signals; and wherein the transceiver performs the steps of:

varying the compression rate of one of the audio and video signals in response to the second signal; and varying the compression rate of the other one of the signals in response to the error signal.

21. The video telephone of claim 20, wherein the controller further includes a memory device for supplying the second signal to the summing junction, the second signal representing a selected one of a plurality of different values stored in the memory device.

22. The video telephone of claim 21, wherein the transceiver includes:

an antenna;

a T/R module coupled to the antenna;

a receiver having an input coupled to the T/R module; and a transmitter having an output coupled to the T/R module.

23. The video telephone of claim 22, wherein the receiver includes:

a demodulator for demodulating an incoming signal from the T/R module;

a demultiplexer for separating the demodulated signal into a transmission header and video, audio and data signals, the transmission header being supplied to the controller;

a first decompressor for decompressing the video signal according to a rate embedded in the video signal; and a second decompressor for decompressing the audio signal according to a rate embedded in the audio signal.

24. The video telephone of claim 22, wherein the transmitter includes:

a first compressor for compressing the video signal to fit within a video bandwidth supplied by the controller;

a second compressor for compressing the audio signal to fit within an audio bandwidth supplied by the controller;

a combiner for combining the compressed video and audio signals;

a PSK modulator responsive to an output of the combiner; and a carrier frequency modulator, responsive to an output of the PSK modulator.

25. The video telephone of claim 24, further including an input for a data signal, and wherein the combiner also combines the data signal with the compressed audio and video signals.

26. A method of communicating digital audio and video signals within an RF bandwidth, comprising the steps of:

compressing the audio and video signals at first and second rates, the first and second rates being adjusted to fit the audio and video signals within the RF bandwidth;

combining the compressed audio and video signals into a composite signal transmitting the composite signal over an RF frequency; and further comprising the step of combining a transmission header with the audio and video signals, the transmission header including a number of bits for a request to change the allocation of the RF bandwidth among the audio and video signals.

27. The method of claim 1, further comprising the step of combining a data signal with the compressed voice and video signal.

28. The method of claim 1, further comprising the step of determining audio and video bandwidths, the audio and video signals being compressed to fit within the audio and video bandwidths, respectively.

29. The method of claim 28, wherein the audio and video bandwidths are determined by the steps of:

storing a plurality of different values for one of the audio and video bandwidths in computer memory;

selecting one of the plurality values as the bandwidth for the one signal; and determining a value for the other one of the audio and video bandwidths from the selected bandwidth and the RF bandwidth.

30. The method of claim 1, further comprising the steps of:

receiving a transmission;

demodulating the transmission;

separating the transmission into video, audio and data signals;

decompressing the video signal according to a rate embedded in the video signal; and decompressing the audio signal according to a rate embedded in the audio signal.

31. The method of claim 1, further comprising the steps of:

receiving a transmission;

demodulating the transmission;

separating a transmission header from the transmission;

examining the transmission header for a request to change the allocation of the RF bandwidth among the video and audio signals; and changing the RF bandwidth allocation in response to the request.

32. The method of claim 1, further comprising the steps of:

performing a dither on the video signal after transmission; and displaying the dithered video signal, whereby the video signal is compressed prior to transmission and dithered after transmission.

* * * * *